(12) United States Patent
Song et al.

(10) Patent No.: US 11,663,473 B2
(45) Date of Patent: *May 30, 2023

(54) METHOD AND APPARATUS WITH NEURAL NETWORK PERFORMING DECONVOLUTION

(71) Applicant: SAMSUNG ELECTRONICS CO., LTD., Suwon-si (KR)

(72) Inventors: Joonho Song, Hwaseong-si (KR); Sehwan Lee, Suwon-si (KR); Junwoo Jang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 235 days.

This patent is subject to a terminal disclaimer.

(21) Appl. No.: 17/112,041

(22) Filed: Dec. 4, 2020

(65) Prior Publication Data

US 2021/0117791 A1 Apr. 22, 2021

Related U.S. Application Data

(63) Continuation of application No. 16/107,717, filed on Aug. 21, 2018, now Pat. No. 10,885,433.

(30) Foreign Application Priority Data

Nov. 7, 2017 (KR) .................. 10-2017-0147617

(51) Int. Cl.
*G06N 3/08* (2023.01)
*G06F 17/15* (2006.01)
(Continued)

(52) U.S. Cl.
CPC ............. *G06N 3/08* (2013.01); *G06F 17/153* (2013.01); *G06N 3/04* (2013.01); *G06N 3/045* (2023.01)

(58) Field of Classification Search
CPC ........ G06F 17/15; G06F 17/153; G06F 17/16; G06N 3/02; G06N 3/04; G06N 3/0454;
(Continued)

(56) References Cited

U.S. PATENT DOCUMENTS 9,547,821 B1 1/2017 Loreggia et al.
9,953,236 B1 4/2018 Huang et al.
(Continued)

FOREIGN PATENT DOCUMENTS

CN 106991651 A 7/2017
EP 3 330 898 A1 6/2018

OTHER PUBLICATIONS

Wolfram MathWorld, the web's most extensive mathematics resource, https://mathworld.worfram.com/RotationMatrix.html, 2003 (Year: 2003).*

(Continued)

*Primary Examiner* — Emily E Larocque
(74) *Attorney, Agent, or Firm* — NSIP Law

(57) ABSTRACT

A neural network apparatus configured to perform a deconvolution operation includes a memory configured to store a first kernel; and a processor configured to: obtain, from the memory, the first kernel; calculate a second kernel by adjusting an arrangement of matrix elements comprised in the first kernel; generate sub-kernels by dividing the second kernel; perform a convolution operation between an input feature map and the sub-kernels using a convolution operator; and generate an output feature map, as a deconvolution (Continued)

of the input feature map, by merging results of the convolution operation.

15 Claims, 11 Drawing Sheets

(51) Int. Cl.
*G06N 3/045* (2023.01)
*G06N 3/04* (2023.01)

(58) Field of Classification Search
CPC ............ G06N 3/06; G06N 3/063; G06N 3/08; G06N 3/084
See application file for complete search history.

(56) References Cited

U.S. PATENT DOCUMENTS

| | | |
|---|---|---|
| 2016/0328645 A1 | 11/2016 | Lin et al. |
| 2016/0328646 A1 | 11/2016 | Lin et al. |
| 2016/0328647 A1 | 11/2016 | Lin et al. |
| 2016/0342890 A1 | 11/2016 | Young |
| 2016/0342891 A1 | 11/2016 | Ross et al. |
| 2016/0350645 A1 | 12/2016 | Brothers et al. |
| 2016/0350930 A1 | 12/2016 | Lin et al. |
| 2016/0358069 A1 | 12/2016 | Brothers et al. |
| 2016/0379115 A1 | 12/2016 | Burger et al. |
| 2017/0193400 A1 | 7/2017 | Bhaskar et al. |
| 2017/0200094 A1 | 7/2017 | Bruestle et al. |
| 2018/0032857 A1 | 2/2018 | Lele et al. |
| 2018/0232640 A1 | 8/2018 | Ji et al. |
| 2019/0026078 A1 | 1/2019 | Bannon et al. |
| 2020/0110604 A1 | 4/2020 | Lovell et al. |
| 2020/0180032 A1 | 6/2020 | Ishii et al. |

OTHER PUBLICATIONS

Jefkine Kafunah, "Backpropagation In Convolutional Neural Networks," DeepGrid-Organic Deep Learning, Nov. 29, 2016, pp. 1-10, XP055470261.

European Office Action dated Sep. 20, 2021 in counterpart European Patent Application No. 18202762.3 (9 pages in English).

Long et al., "Fully Convolutional Networks for Semantic Segmentation", *IEEE Conference on Computer Vision and Pattern Recognition (CVPR)*, Mar. 8, 2015, pp. 1-10 (10 pages in English).

Noh et al., "Learning Deconvolution Network for Semantic Segmentation", *Department of Computer Science and Engineering*, Dec. 7, 2015, pp. 1520-1528 (8 pages in English).

Dumoulin et al., "A Guide to Convolution Arithmetic for Deep Learning", *Cornell University Library*, Mar. 23, 2016, pp. 1-28 (28 pages in English).

Shi et al., "Real-Time Single Image and Video Super-Resolution Using an Efficient Sub-Pixel Convolutional Neural Network", *IEEE Conference on Computer Vision and Pattern Recognition (CVPR)*, Jun. 27, 2016, pp. 1874-1883 (10 pages English).

Shi et al., "Is the Deconvolution Layer the Same as a Convolutional Layer?" *CORR (ARXIV)*, Sep. 22, 2016, pp. 1-7 (7 pages in English).

Aitken et al., "Checkerboard Artifact Free Sub-Pixel Convolution", *CORR (ARXIV)*, Jul. 10, 2017, pp. 1-16 (16 pages in English).

Kafunah et al., "Backpropagation in Convolutional Neural Networks", *DeepGrid Blog*, Oct. 16, 2017, pp. 1-11 (11 pages in English).

Extended European Search Report dated Mar. 22, 2019 in corresponding European Patent Application No. 18202762.3 (13 pages in English).

\* cited by examiner ized computational architectures, that after substantial training may provide computationally intuitive feature extractions or recognitions, mappings between input patterns and output patterns, pattern recognitions of input patterns, or categorization in various forms.

METHOD AND APPARATUS WITH NEURAL NETWORK PERFORMING DECONVOLUTION

CROSS-REFERENCE TO RELATED APPLICATIONS

This application is a continuation of U.S. patent application Ser. No. 16/107,717 filed on Aug. 21, 2018 which claims the benefit under 35 USC § 119(a) of Korean Patent Application No. 10-2017-0147617, filed on Nov. 7, 2017, in the Korean Intellectual Property Office, the disclosures of which are incorporated herein in their entirety by reference.

BACKGROUND

1. Field

The present disclosure relates to methods and apparatuses with a neural network performing deconvolution.

2. Description of Related Art

Technological automation of feature extraction, pattern recognition, and/or analyses, as only examples, has been implemented through processor implemented neural network models, as specialized computational architectures, that after substantial training may provide computationally intuitive feature extractions or recognitions, mappings between input patterns and output patterns, pattern recognitions of input patterns, or categorization in various forms. The trained capability of extracting such information or recognitions, generating such mappings, performing such pattern recognitions, or performing such categorizations may be referred to as a learning capability of the neural network. Such trained capabilities may also enable the specialized computational architecture to classify an input pattern or object(s), or portions of the input pattern or object(s), e.g., as a member that belongs to one or more predetermined groups. Further, because of the specialized training, such specially trained neural network may thereby have a generalization capability of generating a relatively accurate or reliable output with respect to an input pattern that the neural network may not have been trained for, for example. However, because such operations are performed through such specialized computation architectures, and in different automated manners than they would have been performed in non-computer implemented or non-automated approaches, they also invite problems or drawbacks that only occur because of the automated and specialized computational architecture manner that they are implement.

Accordingly, apparatuses configured to process such neural networks need to perform a large number of operations with respect to complex input data, which may require large power consumption and require long processing times.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a, the apparatus including: a memory configured to store a first kernel; and a processor configured to: obtain, from the memory, the first kernel; calculate a second kernel by adjusting an arrangement of matrix elements comprised in the first kernel; generate sub-kernels by dividing the second kernel; perform a convolution operation between an input feature map and the sub-kernels using a convolution operator; and generate an output feature map, as a deconvolution of the input feature map, by merging results of the convolution operation.

The processor may be further configured to: obtain, from the memory, information of a stride, and generate the sub-kernels by dividing the second kernel based on the information of the stride.

The processor may be further configured to divide the second kernel into the sub-kernels, and the number of the sub-kernels corresponds to a value obtained by squaring a value of the stride.

The processor may be further configured to: adjust the arrangement of the matrix elements comprised in the first kernel by performing a transpose operation; and divide the second kernel by performing a split operation.

Matrix elements comprised in each respective sub-kernel correspond to matrix elements comprised in the second kernel separated by a value of the stride.

The processor may be configured to perform the convolution operation, using the convolution operator, in a deconvolution layer of a neural network, where the neural network further may include a convolutional layer that performs a corresponding convolution operation using the convolution operator, and a fully connected layer.

The processor may be further configured to implement the corresponding convolution operation using the convolution operator for generating the input feature map.

The processor may be further configured to: process the sub-kernels in parallel, by performing the convolution operation between the sub-kernels and the input feature map by shifting each of the sub-kernels with respect to the input feature map, and generate the output feature map by merging results of the parallel processing of the sub-kernels.

In another general aspect, there is provided a neural network apparatus, the apparatus including: a memory configured to store sub-kernels; and a processor configured to: obtain, from the memory, the sub-kernels, perform a convolution operation between an input feature map and the sub-kernels using a convolution operator, and generate an output feature map, as a deconvolution of the input feature map, by merging results of the convolution operation, wherein the sub-kernels obtained from the memory are generated by adjusting an arrangement of matrix elements comprised in an initial kernel and dividing the adjusted initial kernel.

The number of the sub-kernels divided from the initial kernel may be determined based on a stride value stored in the memory.

The number of the sub-kernels corresponds to a value obtained by squaring the stride value.

The sub-kernels are generated by adjusting the arrangement of the matrix elements comprised in the initial kernel by performing a transpose operation and dividing the adjusted initial kernel by performing a split operation.

Matrix elements comprised in each respective sub-kernel correspond to matrix elements comprised in the initial kernel separated by a value of the stride.

The processor may be configured to perform the convolution operation, using the convolution operator, in a deconvolution layer of a neural network, where the neural network further may include a convolutional layer that performs a corresponding convolution operation using the convolution operator, and a fully connected layer.

The processor may be further configured to: process the sub-kernels in parallel, by performing the convolution operation between the sub-kernels and the input feature map by shifting each of the sub-kernels with respect to the input feature map, and generate the output feature map by merging results of the parallel processing of the sub-kernels.

In another general aspect, there is provided a processor-implemented neural network method, the method including: obtaining, from a memory, a first kernel, calculating a second kernel by adjusting an arrangement of matrix elements comprised in the first kernel; generating sub-kernels by dividing the second kernel; performing a convolution operation between an input feature map and the sub-kernels using a convolution operator; and generating an output feature map, as a deconvolution of the input feature map, by merging results of the convolution operation.

The method of claim 16, wherein the generating of the sub-kernels may include generating the sub-kernels by dividing the second kernel based on information of a stride.

The second kernel may be divided into the sub-kernels, and the number of the sub-kernels corresponds to a value obtained by squaring a value of the stride.

The calculating of the second kernel may include adjusting the arrangement of the matrix elements comprised in the first kernel by performing a transpose operation, and the generating of the sub-kernels may include dividing the second kernel by performing a split operation.

The method may further include performing the convolution operation, using the convolution operator, in a deconvolution layer of a neural network, where the neural network further may include a convolutional layer that performs a corresponding convolution operation using the convolution operator, and a fully connected layer.

The generating of the output feature map may include: processing the sub-kernels in parallel, by performing the convolution operation between the sub-kernels and the input feature map by shifting each of the sub-kernels with respect to the input feature map, and generating the output feature map by merging results of the parallel processing of the sub-kernels.

A non-transitory computer-readable storage medium storing instructions that, when executed by a processor, cause the processor to perform the method.

The convolution operator may be a multiply-accumulate (MAC) operator.

In another general aspect, there is provided a processor-implemented neural network, the method including: obtaining an input feature map and a first kernel; generating a second kernel by adjusting an arrangement of matrix elements comprised in the first kernel; dividing the second kernel into sub-kernels; performing a convolution operation between the input feature map and each of the sub-kernels; and generating an output feature map, as a deconvolution of the input feature map, by merging results of the convolution operation.

Matrix elements comprised in each respective sub-kernel correspond to matrix elements comprised in the second kernel separated a stride of the convolution operation.

Matrix elements of the output feature map, corresponding to results from the convolution operation between the input feature map and a sub-kernel of the sub-kernels, are separated a stride of the convolution operation.

The method may further include obtaining an input image map; generating the input feature map by performing a convolution operation using the input image map; classifying an object of the input image map based on the generated input feature map; and determining either one or both of a location and a boundary of the classified object based on the output feature map.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The expressions described in various locations of the present specification, such as "in some embodiments" or "according to an embodiment," do not necessarily refer to the same embodiment.

Some embodiments of the present disclosure may be described in terms of functional block components and various processing steps. Part or all of such functional blocks may be realized by any number of hardware and/or hardware components configured to perform the specified functions. For example, part or all of such functional blocks may be realized by one or more processors configured to execute instructions stored on a non-transitory computer-readable medium. As another example, the functional blocks of the present disclosure may employ various integrated circuit components, which may carry out a variety of functions under the control of one or more microprocessors. Also, for example, the functional blocks of the present disclosure may be implemented with any programming or scripting language. The functional blocks may be implemented in algorithms that execute on one or more processors. Furthermore, the present disclosure could employ any number of techniques for electronics configuration, signal processing and/or control, data processing and the like.

The connecting lines or connectors shown in the various figures presented are intended to represent exemplary functional relationships and/or physical or logical couplings between the various elements. It should be noted that many alternative or additional functional relationships, physical connections or logical connections may be present in a practical apparatus.

Hereinafter, the present disclosure will be described by referring to the accompanying drawings.

Figure 1:
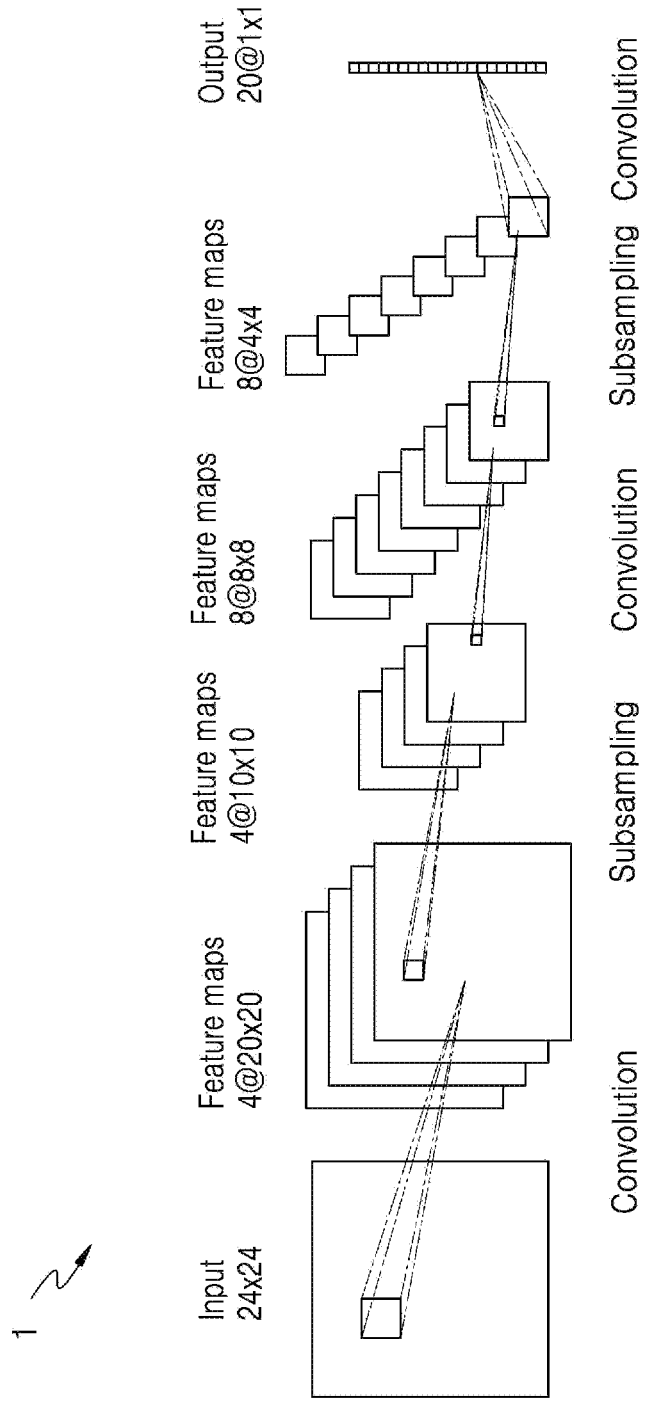
FIG. 1 is a diagram for describing an architecture of a neural network according to an embodiment.

FIG. 1 is a diagram for describing an architecture of a neural network 1 according to an embodiment.

Referring to FIG. 1, the neural network 1 may have an architecture of a deep neural network (DNN) or an architecture of an n-layer neural network. The DNN or the n-layer neural network may correspond to a convolutional neural network (CNN), a recurrent neural network (RNN), a deep belief network, restricted Boltzman machines, etc. For example, the neural network 1 may be implemented as the CNN. However, the neural network 1 is not limited thereto. The CNN, which is the example of the neural network 1 illustrated in FIG. 1, may include a sub-sampling layer, a pooling layer, a fully connected layer, etc., in addition to a convolution layer.

For example, in the present disclosure, apparatuses may be described as implementing CNNs, e.g., based on convolutions and/or deconvolutions using previously trained parameters and/or convolutions and/or deconvolutions or convolution operations that are selectively performed based on such previously trained parameters for such convolution and/or deconvolution disclosed herein, though embodiments are not limited to such apparatuses only performing such convolutional/deconvolutional and/or selective convolutional/deconvolutional operations, but rather embodiments also include such apparatuses also being configured to train the CNN as described below, as well as or also use the trained CNN and/or selectively implemented CNN in an example detection, recognition, rejection, verification, classification, or other such 'interpretative' operations or objectives the respective layers or overall CNN are trained to perform. Herein, it is also noted that use of the term 'may' with respect to an example or embodiment, e.g., as to what an example or embodiment may include or implement, means that at least one example or embodiment exists where such a feature is included or implemented while all examples and embodiments are not limited thereto.

Referring to FIG. 1, a neural network apparatus may acquire trained parameters corresponding to one or more layers included in a neural network, e.g., the herein discussed example CNN type of neural network which may be configured to perform deconvolution or convolution and deconvolution, noting that embodiments are not limited thereto. For example, the neural network apparatus may acquire parameters, e.g., as determined by the neural network apparatus during the training of the neural network by the neural network apparatus, from memory, or through external request or provision. Additionally, the neural network apparatus may acquire the parameters from provided kernel, kernel element, and/or other connection weight vectors, matrix or matrices, or other format kernels, kernel elements, and/or other connection weights, representing some or all of the trained kernels and/or weighted connections of the trained neural network. The neural network apparatus may also be provided or made available the kernel, kernel element, and/or other connection weight vectors, matrix or matrices, or other format kernels, kernel elements, and/or connection weights, as a result of training of the neural network by another processing apparatus or server, for example. The neural network apparatus is representative of one or more processors and one or more non-transitory memories, for example, such as to store such parameters, for use during and after the convolutional/deconvolutional and/or selective convolutional/deconvolutional operations of the neural network, and for storing of instructions, which when executed by the one or more processors, cause the one or more processors to implement one or more or all operations described herein, for example.

The neural network includes a plurality of layers, and each of the layers includes a plurality of nodes. For example, there may be an input layer, at least one hidden layer, and an output layer. Depending on the architecture of the neural network, nodes included in neighboring layers may be selectively connected according to respective connections, e.g., which may or may not be weighted. For example, the neural network may be implemented by a processor, i.e., one or more processors, configured to generate a neural network structure/architecture with such a plurality of layers each including plural nodes and configured to apply such example weighted connections between neighboring nodes in neighboring layers of the neural network structure, and/or apply such example kernels or weighted connections within layers, to interpret input data applied to the neural network structure. As only examples, herein such an 'interpretation' of input data may include a performed detection, recognition, verification, or rejection, such as image recognition or verification, translation or rejection, or input data binary or multi-class classification, clustering, pattern observation, transformation, and/or regression, as well as any other trained objective of the neural network. Thus, as a non-limiting examples, in varying embodiments, the neural network may be trained for image or object detection, recognition, identification, rejection, or discrimination. Thus, based on the training data and desired interpretation objective, the architecture, selective connections between neighboring nodes and/or kernels, kernel elements, or other connections within layers may be varied during training until the neural network is trained to a desired acceptability for the desired interpretation objective. For example, in examples where the neural network is trained for image or object detection, recognition, verification, or rejection, the neural network may include convolutional layers or be representative of a CNN, and thus the respective convolutional kernel elements, e.g., for varying feature extractions through feature kernels, may be trained to an original desired acceptability for the image or object detection, recognition, verification, or rejection operations. The neural network may also be of a different type of neural network and merely include one or more convolutional and/or deconvolutional layers, e.g., for selective feature extraction, for other objectives. Thus, herein, though embodiments may be discussed from the perspective of a neural network apparatus, such reference to CNNs is not intended to be limiting of the apparatus to only implementing CNNs or even to implement CNNs. Returning to the training of the neural network, the resultant kernels, kernel elements, and/or other connection weights of the trained neuro network may be referred to as parameters of the neural network, e.g., demonstrated as at least trained kernel elements of a convolutional and/or deconvolutional layer or operation of the CNN. For example, the neural network may be trained based on the labeled input image information or desired corresponding output images, classifications, or geometric parameters, such as through a backpropagation algorithms. In the training, example connection weightings between nodes of different hidden layers may be recursively adjusted until the corresponding neural network model is trained with a desired accuracy rate or below a maximum error rate, for example. Likewise, during the training, example kernels, kernel elements, or connection weightings between nodes within respective layers may be adjusted in the recursive adjusting. The respectively trained neuro network may be stored in a memory of the training and/or recognition apparatus, for example. In examples, the trained neural network may be stored in trained vectors, matrix or matrices, or other formats, e.g., where elements of the vectors, matrices, or other formats represent or suggest the corresponding trained parameters, e.g., trained kernels, kernel elements, and/or other weighted connections, of the corresponding neural network structure. The stored trained neural network may further include hyper-parameter information, which may define the specific structure or architecture of the corresponding neural network for which the example stored trained parameters correspond to. The hyper-parameters may define the architecture or structure of the inputs and output layers as well as how many hidden layers there are and the function and structure/architecture of the respective hidden layers, such the respective arrangement and which are fully connected, recurrent, convolutional, de-convolutional, or pooling layers, as only examples. The hyper-parameters may further include information of the configuration and values of any bias and/or contextual nodes in the neural network, corresponding activation functions of the nodes, types of nodes, such as long short-term memory nodes, gated linear unit nodes, or merely nodes configured to perform a single activation function for a summation of inputs, and define any or any further recurrent structures of the neural network, which may vary depending on embodiment and interpretation objective of the trained neural network.

Thus, as illustrated, neural network 1 may be implemented as an architecture having a plurality of layers including an input image layer, feature map generating layers, and an output layer. In the neural network 1, a convolution operation between the input image, and a filter referred to as a kernel, is performed, and as a result of the convolution operation, the feature maps (or activation maps or convolved features) are output. Here, the feature maps that are output are input feature maps, with a convolution operation between the output feature maps and the kernel being performed again, and as a result, new feature maps are output. Based on such repeatedly performed convolution operations, ultimately, results of recognition of characteristics of the input image via the neural network 1 may be output.

For example, when an image having a size of 24×24 pixels is input in the neural network 1 of FIG. 1, the input image may be output as feature maps of 4 channels having a 20×20 size via a convolution operation between the input image and the kernel. Also, feature maps of 4 channels having a 10×10 size may be output by using only one or more of pixel values of the feature maps of 4 channels having the 20×20 size via a sub-sampling process. Methods for sub-sampling may include max-pooling, average-pooling, etc.

Next, the size of the feature maps having the 10×10 size may be decreased via repeated convolution operations between the feature maps and the kernel and repeated sub-sampling operations. Thus, ultimately, global characteristics of the input image may be output. In the neural network 1, a convolution operation and sub-sampling (or pooling or down-sampling) may be repeatedly performed in a plurality of layers, and thus, robust characteristics, which may represent a general image, may be filtered from the image and may be output. Also, the output global characteristics may be input in the fully connected layer so as to ultimately derive a recognition result of the input image.

Figure 2:
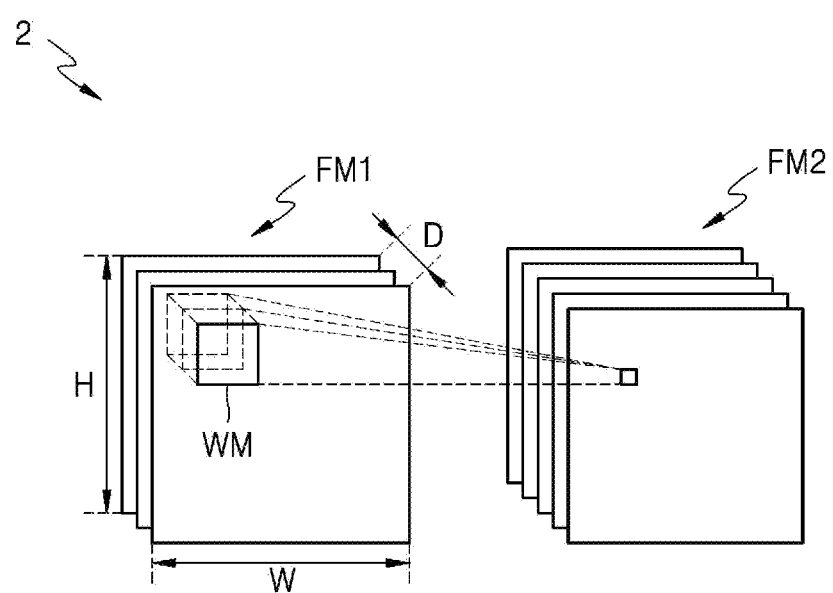
FIG. 2 is a diagram for describing a relationship between an input feature map and an output feature map in a neural network according to an embodiment.

FIG. 2 is a diagram for describing a relationship between an input feature map and an output feature map in the neural network 1, according to an embodiment.

Referring to FIG. 2, with respect to a layer 2 in the neural network 1, a first feature map FM1 may correspond to the input feature map, and a second feature map FM2 may correspond to the output feature map. A feature map may denote a set of data representing various characteristics of input data. The first and second feature maps FM1 and FM2 may have elements of a two-dimensional matrix or elements of a three-dimensional matrix, and pixel values may be defined in each of the elements of the two-dimensional matrix and the elements of the three-dimensional matrix. The first and second feature maps FM1 and FM2 may have a width W (also referred to as a column), a height H (also referred to as a row), and a depth D. here, the depth D may correspond to the number of channels.

The layer 2 may thus perform a convolution operation between the first feature map FM 1 and a kernel, and as a result, the second feature map FM2 may be generated. The kernel is a weight defined in the elements of the two-dimensional matrix or the elements of the three-dimensional matrix, and when the convolution operation between the first feature map FM1 and the kernel is performed, characteristics of the first feature map FM1 may be filtered. The kernel shifts the first feature map FM1 based on a sliding window technique to perform a convolution operation between the kernel and windows (also referred to as tiles) of the first feature map FM1. During each shift, each of weights included in the kernel may be multiplied by or added to each of pixel values of the windows overlapping each other in the first feature map FM1. The stride may correspond to the number of pixels by which the kernel slides between shifts. As the convolution operation between the first feature map FM1 and the kernel is performed, a channel of the second feature map FM2 may be generated. FIG. 1 illustrates one kernel. However, the convolution operation may be performed between each of a plurality of kernels and the first feature map FM1, so that the second feature map having a plurality of channels may be generated.

The second feature map FM2 may also thus correspond to an input feature map of a next layer of the neural network 1. For example, the second feature map FM2 may be the input feature map of a pooling layer (or a sub-sampling layer).

FIGS. 1 and 2 illustrate only the schematic architecture of the neural network 1, for convenience of explanation. However, it would be understood that unlike the illustration of FIGS. 1 and 2, in varying examples the neural network 1 may be implemented to have more or less layers, feature maps, kernels, etc. than the illustration of FIGS. 1 and 2, and includes various sizes of the layers, the feature maps, the kernels, etc. may be modified in various ways.

Figure 3:
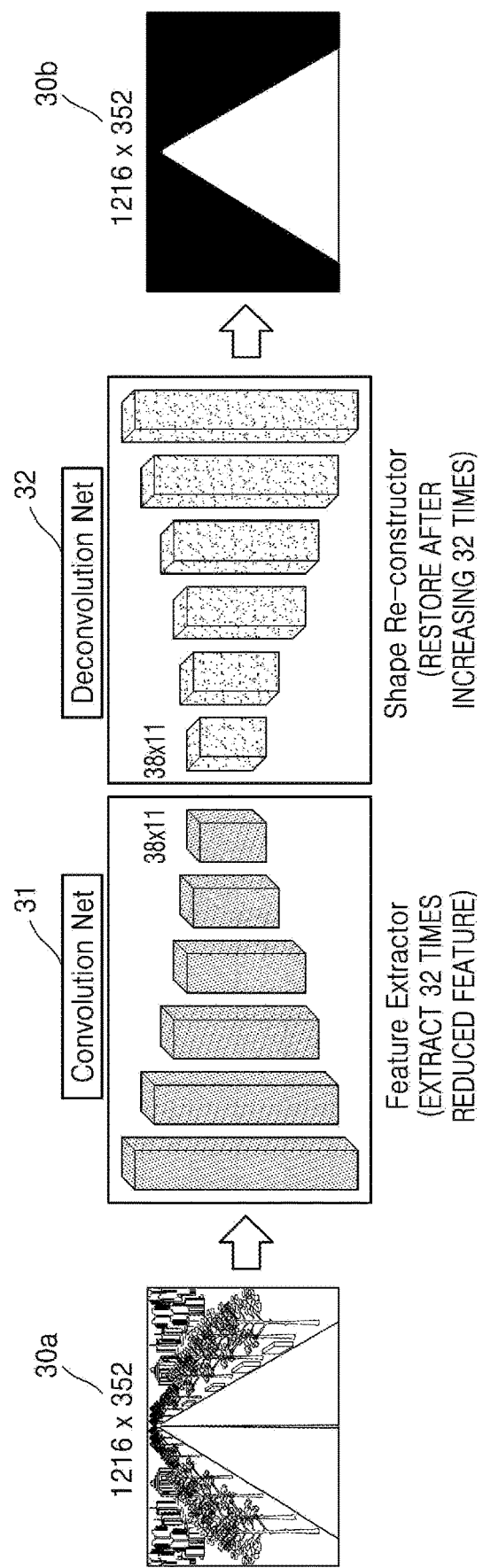
FIG. 3 is a diagram for describing an architecture of a convolution network and a deconvolution network, according to an embodiment.

FIG. 3 is a diagram for describing an architecture of a convolution network 31 and a deconvolution network 32, according to an embodiment.

Unlike a technique in which a limited number of objects included in an image are classified, or an object in the image is recognized and a region including the object is indicated as a bounding box in order to detect the object, semantic segmentation or scene segmentation is a technique for precisely identifying a boundary of a specific object included in an image. That is, semantic segmentation attempts to partition an image into semantically meaningful parts, and to classify the parts into classes. Semantic segmentation is a technique not only for identifying what is in the image, but also for precisely figuring out locations of objects in the image.

In the convolution network 31, operations are performed in a plurality of operations of convolution layers, sub-sampling layers, and fully connected layers, and thus, a size of a feature map gradually decreases. Thus, through such operations, an output feature map generated in the convolution network 31 may lose location information (or spatial information) which was included in an input image map. In order to perform the semantic segmentation, the size of the feature map may be increased again by inputting the output feature map generated in the convolution network into the deconvolution network 32, so that detailed information, such as the location information, etc., may be restored.

Referring to FIG. 3, a neural network may include the convolution network 31 and the deconvolution network 32, and the semantic segmentation is performed via the convolution network 31 and the deconvolution network 32.

An image 30a having a size of 1216×352 pixels may be input in the convolution network 31. The image 30a having the size of 1216×352 pixels, which is input in the convolution network 31, may be output from the convolution network 31 as a feature map having a size of 38×11 pixels, which is reduced 32 times through a plurality of operations of convolution layers, pooling (or sub-sampling) layers, and/or fully connected layers. Characteristics of the input image 30a, such as forms and classifications of objects included in the input image 30a, may be extracted by using the feature map having the size of 38×11 pixels, which is ultimately output in the convolution network 31. However, since the size of the output feature map is less than the input image 30a, location information, etc. included in a map of the input image 30a may be lost in the output feature map.

The output feature map having the size of 38×11 pixels of the convolution network 31 may be input in the deconvolution network 32. The input feature map having the size of 38×11 pixels, which is input in the deconvolution network 32, may be output as an output feature map 30b having a size of 1216×352 pixels, which is increased 32 times through a plurality of steps of a deconvolution layer, an unpooling layer, etc. The output feature map 30b, which is ultimately generated in the deconvolution network 32, may have the same size of pixels as the input image 30a, and the output feature map 30b may thereby be caused to include the location information of the input image 30a. Thus, the semantic segmentation may be performed by using the output feature map 30b.

Figure 4:
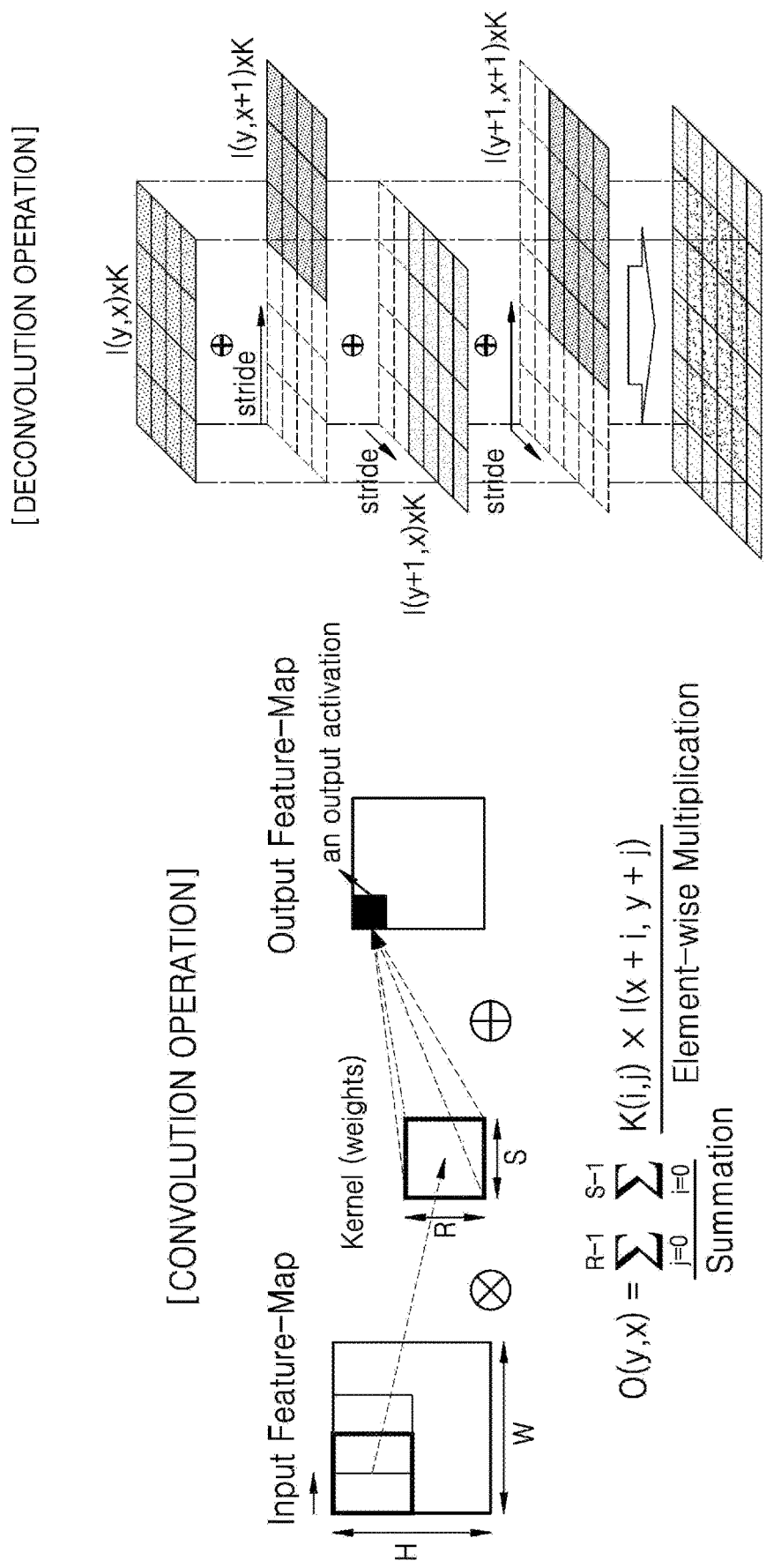
FIG. 4 is a diagram for describing a convolution operation and a deconvolution operation, according to an embodiment.

FIG. 4 is a diagram for describing a convolution operation and a deconvolution operation, according to an embodiment.

Referring to FIG. 4, the convolution operation is performed as follows. The convolution operation between a kernel (or a filter) and windows of an input feature map is performed as the kernel (or the filter) having a matrix form including weight values shifts the input feature map by using a sliding window method. In detail, in the convolution operation, element-wise multiplication between the input feature map and the kernel is performed, and then, summation between results of the element-wise multiplication is performed. As a result of performing the convolution operation between the input feature map and the kernel, an output feature map is generated.

In the deconvolution operation, scalar-matrix multiplication between the input feature map and the kernel is performed, and then, element-size summation between results of the scalar-matrix multiplication, shifted based on a stride distance, may be performed. As a result of performing the deconvolution operation between the input feature map and the kernel, an output feature map is generated.

Multiply-accumulate (MAC) operations using a multiplier and an accumulator mainly account for respective operations performed in a neural network including a convolution network and a deconvolution network. Also, such MAC operations have the largest processing expense. In the convolution network, the convolution operation, which includes in the MAC operation, is performed by using a convolution operator. However, a pattern of the convolution operation and a pattern of the deconvolution operation are different from each other, and thus, typical operations cannot be performed in the deconvolution network by using the convolution operator as used in the convolution network.

When semantic segmentation is performed by using the neural network including the convolution network and the deconvolution network, half of all the MAC operations may occur in the convolution network and the other half may occur in the deconvolution network. Thus, in order to reduce operation costs, there is found that a method of implementation is desired, in which not only the convolution operation, but also the deconvolution operation, may be performed by using the convolution operator.

According to the deconvolution method as disclosed herein, a kernel is processed so that a pattern of the deconvolution operation becomes similar to a pattern of a convolution operation. Therefore, operations of the deconvolution network may be performed using the convolution operator. By using the convolutional operator to perform not only the operations of the convolution network, but also the operations of the deconvolution network, the deconvolution method as disclosed herein increases processing efficiency, increases processing speed, and thus reduces operation costs and increases the efficiency of the computing devices and/or processors on which the method may be implemented. Therefore, the present disclosure improves upon existing computing devices and/or computer functionalities wherein the convolutional operator performs convolution operations but does not perform deconvolution operations. Such existing computer functionalities include image detection, recognition, and/or classification, such as machine vision.

Figure 5:
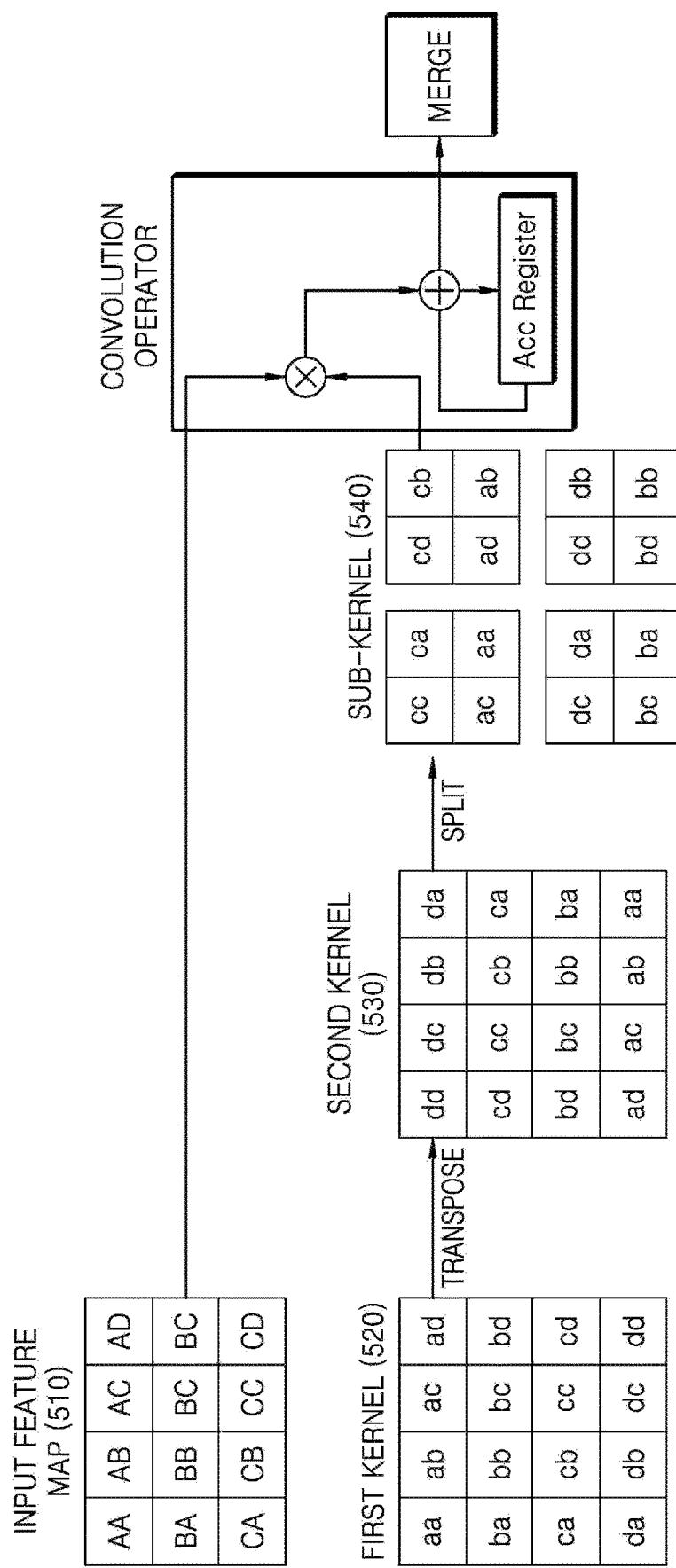
FIG. 5 is a diagram for describing a method of performing a deconvolution operation by using a convolution operator, according to an embodiment.

FIG. 5 is a diagram for describing a method of performing a deconvolution operation by using a convolution operator, according to an embodiment.

Referring to FIG. 5, a neural network apparatus may obtain an input feature map 510 and a first kernel 520 (or an initial kernel), wherein the input feature map 510 and the first kernel 520 are to be processed in a deconvolution layer of a neural network. For example, the input feature map 510 and the first kernel 520 may be data of a matrix form having a 4×4 size.

The neural network apparatus may calculate a second kernel 530 by adjusting an arrangement of matrix elements included in the first kernel 520. The neural network apparatus may adjust the arrangement of the matrix elements included in the first kernel 520 by performing a transpose operation. According to an embodiment, the neural network apparatus may calculate the second kernel 530 by rotating the first kernel 520 by 180 degrees in a clockwise direction by performing the transpose operation.

The neural network apparatus may generate sub-kernels 540 by dividing the second kernel 530. The neural network apparatus may divide the second kernel 530 by performing a split operation. The neural network apparatus may generate the sub-kernels 540 by dividing the second kernel 530 based on a stride value. According to an embodiment, the neural network apparatus may divide the second kernel 530 into the sub-kernels 540, the number of the sub-kernels 540 corresponding to a value obtained by squaring the stride value (for example, 2).

The neural network apparatus may perform a convolution operation between the input feature map 510 and the sub-kernels 540 by using the convolution operator. The neural network apparatus may perform not only a convolution operation in a convolution layer and a fully connected layer, but also an operation in the deconvolution layer, by using the convolution operator.

The neural network apparatus may generate an output feature map by merging results of the convolution operation. The output feature map generated in the deconvolution layer based on the method described in FIG. 5 may be the same as the output feature map generated based on the deconvolution operation described in FIG. 4.

According to an embodiment, the neural network apparatus may apply padding and/or clipping to the input feature map and the output feature map, based on network configuration information, such as a size of the kernel, the stride value, etc. Padding is a method of adding dummy data, by an amount corresponding to a parameter value pre-set in the input and output feature maps, wherein '0 (zero)' may be used as the dummy data. Also, clipping is a reverse method of padding, in which a certain area of the input and output feature maps is cut.

The transpose operation and the split operation may be performed in a compiling step, and the neural network apparatus may obtain data of the sub-kernels 540 from a memory, wherein the sub-kernels 540 may be generated by adjusting an arrangement of matrix elements included in each of initial kernels and dividing the adjusted initial kernels.

Figure 6:
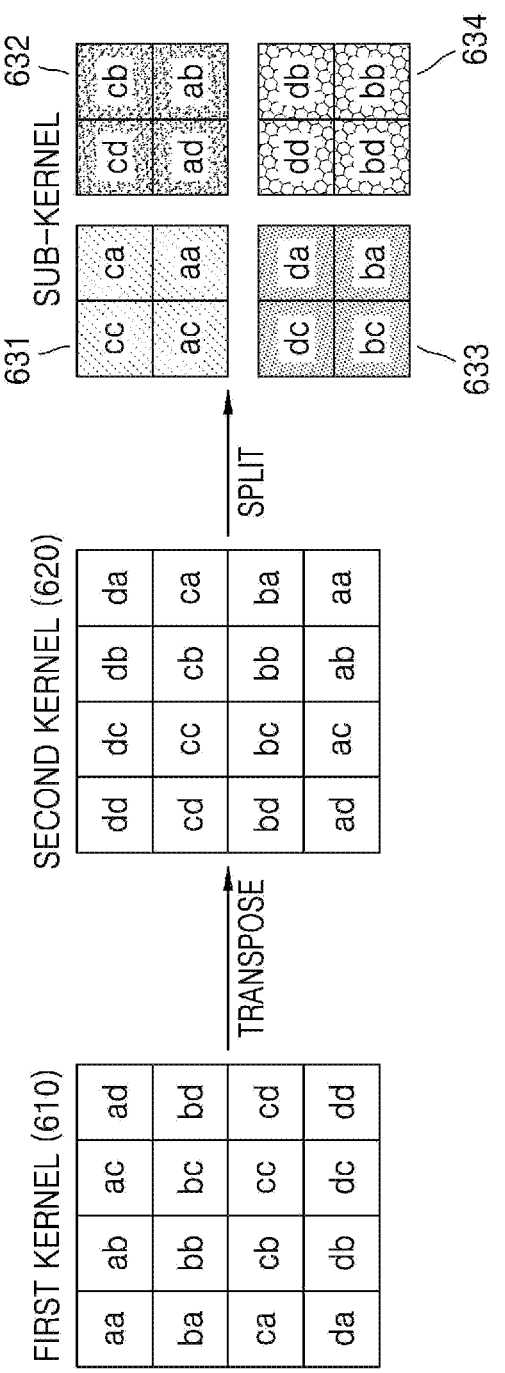
FIG. 6 is a diagram for describing an example of a transpose operation and a split operation, performed in a deconvolution layer, according to an embodiment.

FIG. 6 is a diagram for describing an example of the transpose operation and the split operation performed in the deconvolution layer, according to an embodiment.

Referring to FIG. 6, a neural network apparatus may obtain, from a memory, a first kernel 610 (or an initial kernel) to be processed in the deconvolution layer. The neural network apparatus may process the first kernel 610 in order to perform a deconvolution operation by using a convolution operator. The neural network apparatus may calculate a second kernel 620 by adjusting an arrangement of matrix elements included in the first kernel 610. According to an embodiment, the neural network apparatus may calculate the second kernel 620 by performing the transpose operation with respect to the first kernel 610. Results of such calculations may be temporarily stored in the memory, or in a local memory, for example. Such transpose operations may also be performed at an earlier time and merely stored alongside the kernel in the memory.

For example, when the first kernel 610 is a matrix of [aa ab ac ad; ba bb bc bd; ca cb cc cd; da db dc dd] having a 4×4 size, the neural network may calculate a matrix of [dd dc db da; cd cc cb ca; bd bc bb ba; ad ac ab aa], which is the second kernel 620 having a 4×4 size, by performing the transpose operation with respect to the first kernel 610. That is, the second kernel 620 may be a matrix generated by rotating the first kernel 610 by 180 degrees in a clockwise direction. However, the method of calculating the second kernel 620 is not limited thereto.

Also, the neural network apparatus may generate sub-kernels 631, 632, 633, and 634 by dividing the calculated second kernel 620. According to an embodiment, the neural network apparatus may generate the sub-kernels 631, 632, 633, and 634 by dividing the second kernel 620 by performing the split operation. Similar to above, such sub-kernels may be generated and stored in the memory or local memory. For example, the sub-kernels may be read from the local memory alongside relevant and selected elements of the corresponding input feature map, when performing the convolution operation with respect to each of the sub-kernels, to generate a resultant output feature map into the example local memory.

For example, when the stride value is 2, the neural network apparatus may select, as an element of the sub-kernel 631, "ac", which is an element (4,2) apart from "aa," a reference, by two spaces in a longitudinal direction, wherein "aa" is an element (4,4) of the second kernel 620. Based on the same method, the neural network apparatus may select, as elements of the sub-kernel 631, "ca," which is an element (2,4) apart from "aa" by two spaces in a lateral direction, and "cc," which is an element (2,2) apart from "aa" by two spaces in a diagonal direction. That is, the sub-kernel 631 may become a matrix of [cc ca; ac aa]. Thereafter, the sub-kernels 632, 633, and 634 may be sequentially generated based on references, "ab," "ba," and "bb," respectively, which are elements (4,3), (3,4), and (3,3) not selected in the second kernel 620.

Regardless of the size of the kernel, the neural network apparatus may determine into how many sub-kernels the second kernel 620 is to be divided based on the stride value. According to an embodiment, the neural network apparatus may divide the second kernel 620 into sub-kernels, the number of the sub-kernels corresponding to a value obtained by squaring the stride value. For example, when the stride value is 2 as described in FIG. 6, the number of the divided sub-kernels 631, 632, 633, and 634 may be 4 ($=2^2$).

According to another embodiment, in the process of dividing the second kernel 620 into a number of sub-kernels based on the stride value, the number of elements of the second kernel 620 may not be sufficient. For example, when the stride value is 3, the number of the divided sub-kernels is 9 ($=3^2$), and the number of elements necessary to generate the 9 sub-kernels is 36 ($=4$ (the number of matrix elements)×9 (the number of sub-kernels)). Since the number of elements of the second kernel 620 is 16, there is a lack of 20 elements needed to generate the 9 sub-kernels. According to an embodiment, a certain value may be filled in the lacking 20 elements. For example, "0" may be filled in the lacking 20 elements, in order to ultimately generate the 9 sub-kernels (36 elements).

Figure 7:
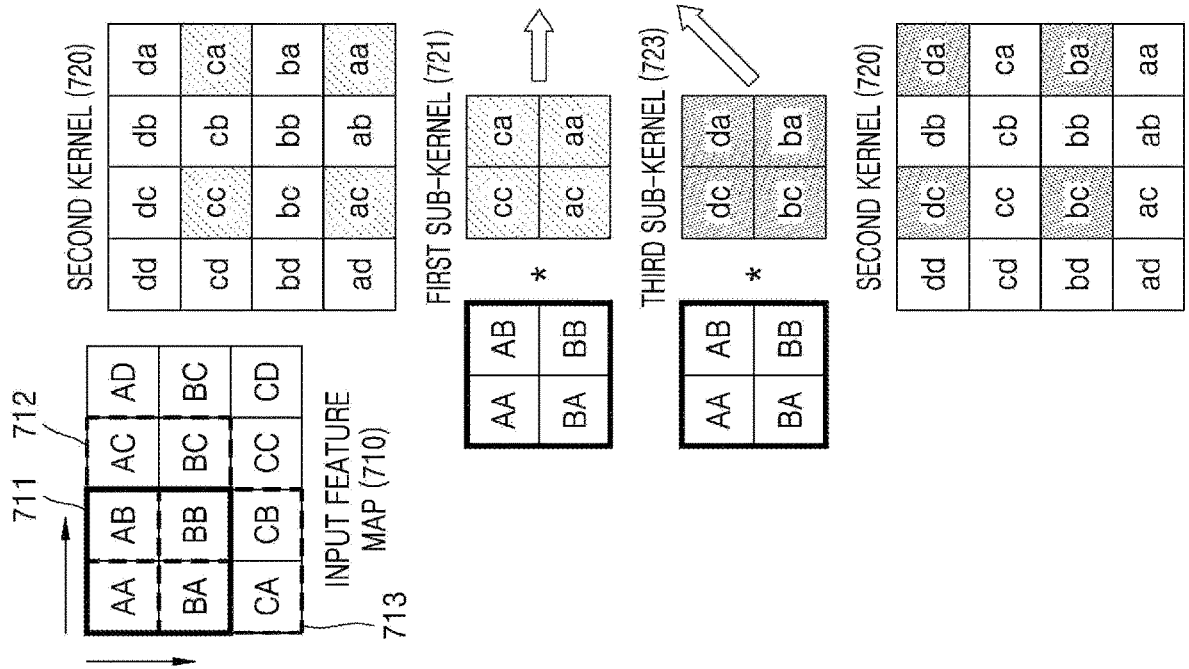
FIG. 7 is a diagram for describing an example of performing a convolution operation in a deconvolution layer, according to an embodiment.

FIG. 7 is a diagram for describing an example of performing convolution operations in a deconvolution layer, according to an embodiment.

Referring to FIG. 7, a neural network apparatus may obtain, from a memory, a first kernel and an input feature map 710 to be processed in the deconvolution layer. A pattern of the convolution operations and a pattern of a deconvolution operation are different from each other, and thus, the first kernel may have to be processed first, in order to use a convolution operator in the deconvolution layer. Feature maps may be stored in the memory or local memory during the convolution operation.

The neural network apparatus may calculate a second kernel 720 by adjusting an arrangement of matrix elements included in the first kernel by performing a transpose operation with respect to the first kernel. Also, the neural network apparatus may divide the second kernel 720 into sub-kernels 721, 722, 723, and 724 by performing a split operation with respect to the second kernel 720.

The neural network apparatus may perform a convolution operation between the input feature map 710 and windows by shifting the sub-kernels 721, 722, 723, and 724 by using a sliding window method. The neural network apparatus may perform a convolution operation between one window and the plurality of sub-kernels 721, 722, 723, and 724, and a convolution operation between a subsequent window and the plurality of sub-kernels 721, 722, 723, and 724. However, the method of performing the convolution operations is not limited thereto.

According to an embodiment, the neural network apparatus may perform a convolution operation between a first window 711 of the first feature map 710 and the first sub-kernel 721. For example, when an element of the first window 711 is [AA AB; BA BB] and an element of the first sub-kernel 721 is [cc ca; ac aa], as a result of performing the convolution operation between the first window 711 and the first sub-kernel 721, a value of "AAxcc+ABxca+BAxac+Bbxaa" is calculated. Also, the neural network apparatus may perform a convolution operation between the first window 711 and the second sub-kernel 722, and as a result of performing the convolution operation between the first window 711 and the second sub-kernel 722, a value of "AAxcd+ABxcb+BAxad+BBxab" is calculated. The neural network apparatus may perform a convolution operation between the remaining sub-kernels 723 and 724 and the first window 711, by using the same method.

After the convolution operation with respect to the first window 711 is performed, the neural network apparatus may perform a convolution operation between a second window 712 and the sub-kernels 721, 722, 723, and 724 by using the sliding window method. For example, as a result of performing the convolution operation between the second window 712 and the first sub-kernel 721, a value of "ABxcc+ACxca+BBxac+BCxaa" is produced.

The neural network apparatus may generate an output feature map 730 by merging values generated as a result of performing the convolution operations between the windows of the input feature map 710 and the sub-kernels 721, 722, 723, and 724.

The neural network apparatus may merge the results of the convolution operations by pairing the result of performing the convolution operation between one sub-kernel and one window with one matrix element of the output feature map 730.

According to an embodiment, 4 values are calculated by performing convolution operations between the first through fourth sub-kernels 721 through 724 and one window. The neural network apparatus may form a 2×2 matrix by using the calculated 4 values and may pair the formed 2×2 matrix with matrix elements of the output feature map 730.

For example, elements (1,1), (1,2), (2,1), and (2,2) of the output feature map 730 may correspond to the results of the convolution operations between the first window 711 and the first through fourth sub-kernels 721 through 724, respectively. Also, elements (1,3), (1,4), (2,3), and (2,4) of the output feature map 730 may correspond to the results of the convolution operations between the second window 712 and the first through fourth sub-kernels 721 through 724, respectively. Also, elements (3,1), (3,2), (4,1), and (4,2) of the output feature map 730 may correspond to the results of the convolution operations between a third window 713 and the first through fourth sub-kernels 721 through 724, respectively. However, the method of merging the results of the convolution operations is not limited thereto.

According to an embodiment, the generated output feature map 730 may be used as an input feature map to be processed in a next deconvolution layer.

Figure 8:
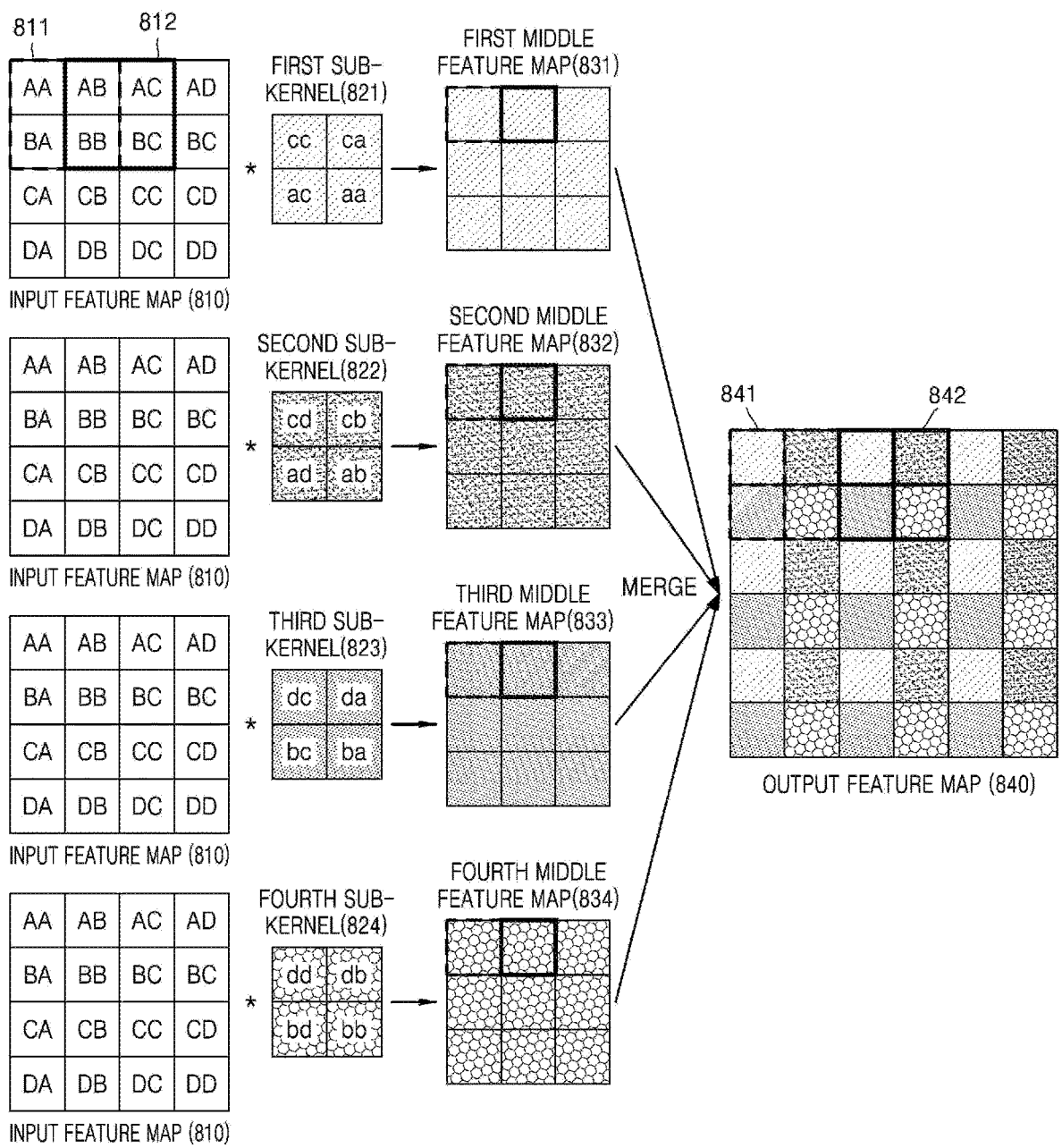
FIG. 8 is a diagram for describing an example of performing a convolution operation in parallel for each sub-kernel in a deconvolution layer, according to an embodiment.

FIG. 8 is a diagram for describing an example of performing a convolution operation in parallel for each sub-kernel in a deconvolution layer, according to an embodiment.

Referring to FIG. 8, a neural network apparatus may use a method of performing convolution operations between a plurality of windows of an input feature map 810 and one sub-kernel, rather than a method of performing convolution operations between one window and a plurality of sub-kernels. That is, the neural network apparatus may process the convolution operations in parallel by performing the convolution operations between the sub-kernels and the input feature map 810 by shifting the sub-kernels with respect to the input feature map 810.

According to an embodiment, the neural network apparatus may generate a first middle feature map 831 by performing the convolution operations between a first sub-kernel 821 and a plurality of windows of an input feature map 810 by shifting the first sub-kernel 821 with respect to the input feature map 810. Based on the same method, the neural network apparatus may generate second through fourth middle feature maps 832 through 834 by performing convolution operations between the plurality of windows of the input feature map 810 and second through fourth sub-kernels 822 through 824.

For example, a result of performing a convolution operation between a first window 811 of the input feature map 810 and the first sub-kernel 821 may correspond to an element (1,1) of the first middle feature map 831, and a result of performing a convolution operation between a second window 812 and the first sub-kernel 821 may correspond to an element (1,2) of the first middle feature map 831.

Also, the neural network apparatus may generate the middle feature maps by performing, in parallel, convolution operations between the sub-kernels and the input feature map 810. The neural network apparatus may generate an output feature map 840 by merging the generated plurality of middle feature maps.

According to an embodiment, the neural network apparatus may merge the middle feature maps based on a size of a matrix of the input feature map 810 and the number of the middle feature maps. For example, the neural network apparatus may apply matrix elements of the first middle feature map 831 as a value of an element (2a−1, 2b−1) of the output feature map 840, may apply matrix elements of the second middle feature map 832 as a value of an element (2a−1, 2b) of the output feature map 840, may apply matrix elements of the third middle feature map 833 as a value of an element (2a, 2b−1) of the output feature map 840, and may apply matrix elements of the fourth middle feature map 834 as a value of an element (2a, 2b) of the output feature map 840 (here, 1a4 (the number of rows of the input feature map 810), 1b4 (the number of columns of the input feature map 810)). That is, an element (1,1) of the first through fourth middle feature maps 831 through 834 may correspond to elements 841 of the output feature map 840 and an element (1,2) of the first through fourth middle feature maps 831 through 834 may correspond to elements 842 of the output feature map 840.

However, the method of merging the middle feature maps generated as a result of performing the convolution operations in parallel is not limited thereto.

Figure 9:
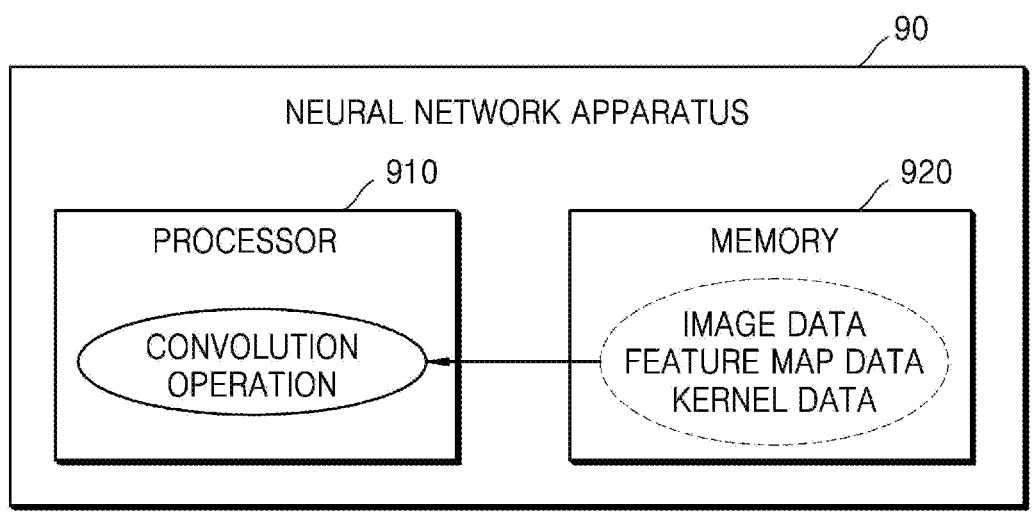
FIG. 9 is a block diagram of hardware components of a neural network apparatus according to an embodiment.

FIG. 9 is a block diagram of hardware components of a neural network apparatus 90.

The neural network apparatus 90 may be implemented as various types of apparatuses, such as a personal computer (PC), a server, a mobile device, an embedded device, etc. For example, the neural network apparatus 90 may include a smartphone, a tablet device, an augmented reality (AR) device, an Internet of things (loT) device, an autonomous vehicle, a robotic device, a medical device, etc., which perform voice recognition, image recognition, image classification, etc., by using a neural network, but is not limited thereto. Further, the neural network apparatus 90 may include a hardware (HW) accelerator exclusively equipped in the apparatuses described above, a neural processing unit (NPU) or tensor processing unit (TPU), which is an exclusive module configured to drive a neural network, or a HW accelerator, such as a neural engine, but is not limited thereto.

Referring to FIG. 9, the neural network apparatus 90 may include a processor 910 and a memory 920. FIG. 9 illustrates the neural network apparatus 90 including components related to the present embodiments. Thus, it is apparent after an understanding of the disclosure of this application that the neural network apparatus 90 may further include other components in addition to the components illustrated in FIG. 9.

The processor 910 may control general functions for executing the neural network apparatus 90. For example, the processor 910 may generally control the neural network apparatus 90 by executing programs stored in the memory 920 in the neural network apparatus 90. The processor 910 may be implemented as a central processing unit (CPU), a graphics processing unit (GPU), an application processor (AP), etc., included in the neural network apparatus 90, but is not limited thereto.

The memory 920 is hardware storing a variety of data processed in the neural network apparatus 90. For example, the memory 920 may store data processed or to be processed in the neural network apparatus 90. Also, the memory 920 may store applications, drivers, etc. to be driven by the neural network apparatus 90. The memory 920 may include random-access memory (RAM), such as dynamic random-access memory (DRAM) and static random-access memory (SRAM), read-only memory (ROM), electrically erasable programmable read-only memory (EEPROM), CD-ROM, blue-rays or other optical disc storages, a hard disk drive (HDD), a solid state drive (SSD), or flash memory.

The processor 910 may read/write neural network data, for example, image data, feature map data, kernel data, etc., from/to the memory 920 and execute a neural network by using the read/written data. When the neural network is executed, the processor 910 may repeatedly perform convolution operations between an input feature map and a kernel, in order to generate data with respect to an output feature map. Here, a number of operations of the convolution operation may be determined, depending on various factors, such as the number of channels of the input feature map, the number of channels of the kernel, a size of the input feature map, a size of the kernel, a precision of a value, etc. Unlike the neural network 1 of FIG. 1, the neural network actually driven in the neural network apparatus 90 may be implemented as a more complicated architecture. Thus, the processor 910 performs the convolution operation with an operation count of up to hundreds of millions to tens of billions, or more, and the frequency at which the processor 910 accesses the memory 920 for the convolution operations rapidly increases. Due to this burden of the operation counts, implementing a typical neural network may not be smoothly performed in mobile apparatuses having relatively low processing performance, such as smartphones, tablet devices, wearable apparatuses, etc., when typical convolution operations are performed with a convolution operator and deconvolution operations are performed with a deconvolution operator.

Meanwhile, the kernel in the neural network may have a floating point-type weight or a fixed point-type weight or may correspond to a binary-weight kernel or a ternary-weight kernel. That is, the kernel in the neural network may be defined in various ways by taking into account various factors, such as a purpose of use of the neural network, the device performance, etc.

Rather than the typical neural network implementation, the processor 910 may drive a convolution network and a deconvolution network using a convolution operator. When semantic segmentation is performed by using the neural network including the convolution network and the deconvolution network, half of all the MAC operations may occur in the convolution network, and the other half may occur in the deconvolution network. For example, resulting in reduced operation costs over typical approaches, a method of implementation for performing not only the convolution operation, but also a deconvolution operation, by using a convolution operator, is found now available herein and thus desired.

The processor 910 may perform convolution operations (or MAC operations) in the convolution network by using the convolution operator. However, a pattern of the convolution operations and a pattern of the deconvolution operations are different from each other, and thus, a kernel to be used in the deconvolution network has to be differently processed, in order to perform operations in the deconvolution network by using the convolution operator.

The processor 910 may obtain, from the memory 920, image data, feature map data, and first kernel (or initial kernel) data to be processed in the deconvolution layer.

According to an embodiment, in order to perform operations by using the convolution operator, the processor 910 may process the first kernel data. The processor 910 may calculate second kernels by adjusting an arrangement of matrix elements included in each of first kernels, and then, may generate sub-kernels by dividing each of the second kernels. Thereafter, the processor 910 may perform a convolution operation between a feature map and the sub-kernels by using the convolution operator. Also, the processor 910 may generate an output feature map by merging results of convolution operations.

According to another embodiment, the processing of the kernel may be performed in a compiling step. That is, the processor 910 may obtain data of the sub-kernels from the memory 920. The sub-kernels may be generated by adjusting an arrangement of matrix elements included in each of the initial kernels and dividing the adjusted initial kernels.

Figure 10:
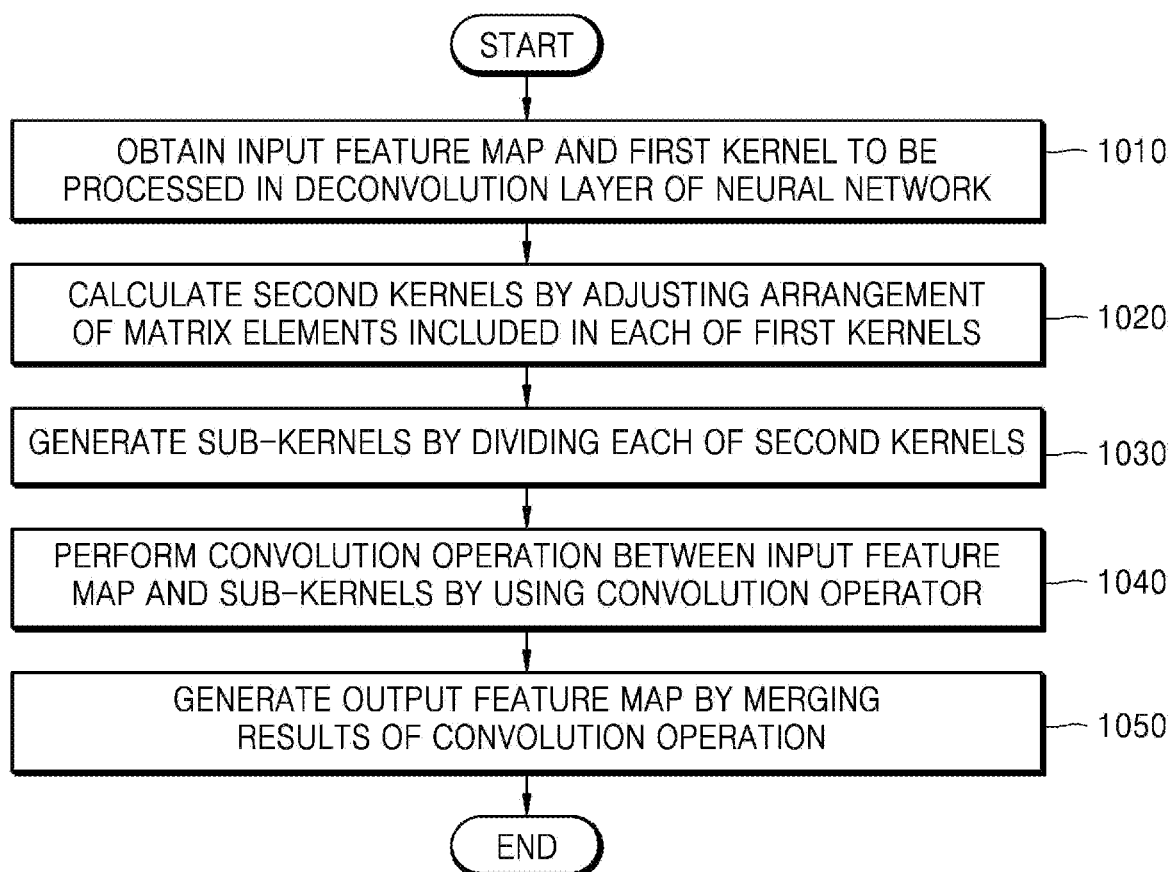
FIG. 10 is a flowchart of a method of performing a deconvolution operation via a neural network apparatus, according to an embodiment.

FIG. 10 is a flowchart of a method of performing a deconvolution operation via a neural network apparatus, according to an embodiment. The method of performing the deconvolution operation via the neural network apparatus, described in FIG. 10, is related to the embodiments described in the above drawings. Thus, even if not described hereinafter, the aspects described above may be applied to the method of FIG. 10.

Referring to FIG. 10, in operation S1010, the neural network apparatus may obtain a feature map and first kernels to be processed in a deconvolution layer of a neural network.

In operation S1020, the neural network apparatus may calculate second kernels by adjusting an arrangement of matrix elements included in each of the first kernels. The neural network apparatus may adjust the arrangement of the matrix elements included in each of the first kernels by performing a transpose operation.

In operation S1030, the neural network apparatus may generate sub-kernels by dividing each of the second kernels. The neural network apparatus may divide each of the second kernels by performing a split operation.

The neural network apparatus may generate the sub-kernels by dividing each of the second kernels based on a stride value. According to an embodiment, the neural network apparatus may divide each of the second kernels into the sub-kernels, the number of the sub-kernels corresponding to a value obtained by squaring the stride value.

In operation S1040, the neural network apparatus may perform a convolution operation between an input feature map and the sub-kernels by using the convolution operator. The neural network apparatus may perform convolution operations in a convolution layer, a fully connected layer, and a deconvolution layer, by using the convolution operator.

In operation S1050, the neural network apparatus may generate an output feature map by merging results of the convolution operations.

According to an embodiment, the neural network apparatus may perform the convolution operation based on a method whereby convolution operations between one window and the plurality of sub-kernels are performed and convolution operations between a subsequent window and the plurality of sub-kernels are performed. The neural network apparatus may generate the output feature map by merging values obtained as a result of performing the convolution operations between the windows of the input feature map and the plurality of sub-kernels.

According to another embodiment, the neural network apparatus may process the sub-kernels in parallel, by performing a convolution operation between each of the sub-kernels and the input feature map by shifting each of the sub-kernels with respect to the input feature map. Also, the neural network apparatus may generate the output feature map by merging results of performing the convolution operations in parallel.

Meanwhile, operations S1020 and S1030 may be performed in a compiling step. The neural network apparatus may obtain data of the sub-kernels from a memory. The sub-kernels may be generated by adjusting an arrangement of matrix elements included in each of initial kernels and dividing the adjusted initial kernels.

Figure 11:
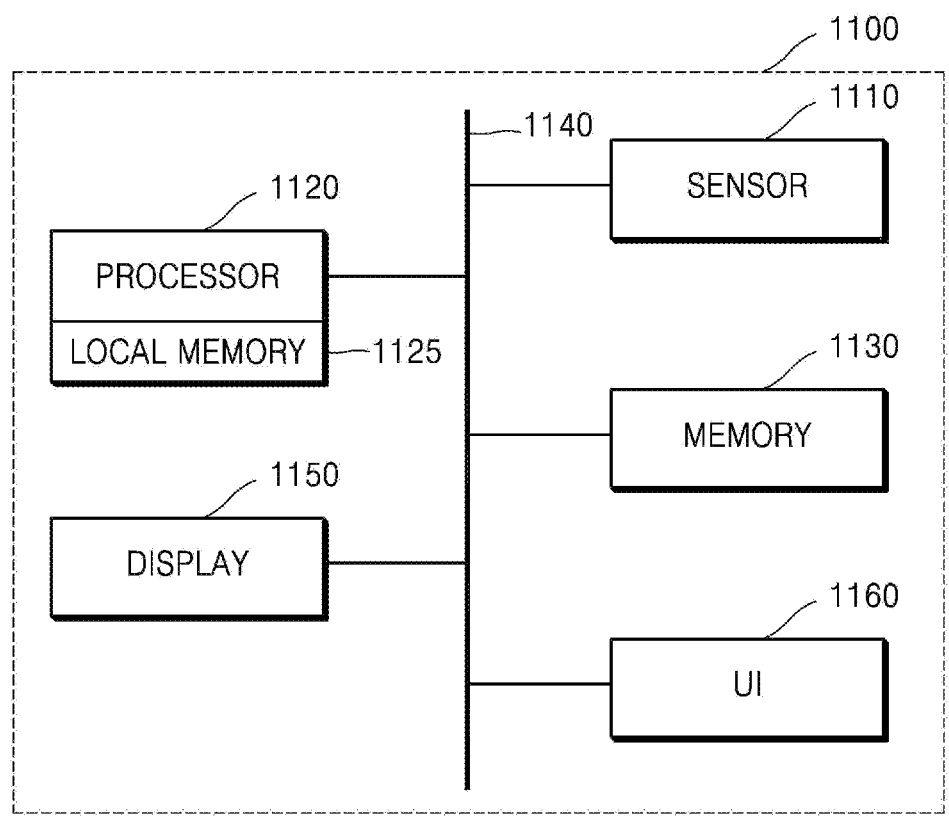
FIG. 11 is a diagram illustrating an example of an electronic system or device configured to implement a neural network inference operation.

FIG. 11 is a diagram illustrating an example of an electronic system or device configured to implement a neural network inference operation.

Referring to FIG. 11, an electronic system or device 1100 includes a sensor 1110, a processor 1120, a local memory 1125, a memory 1130, a display 1150, and a user interface (UI) 1160. The sensor 1110, the processor, 1120, the memory 1130, the display 1150, and the UI 1160 communicate with each other via a bus 1140. The electronic system or device 1100 may correspond to any one or more or all of the above neural network apparatuses and implement any one or more or all of the above neural network processes or methods. As a non-limiting example, the processor 1120 may correspond to processor 910 of FIG. 9, and/or the memory 1130 may correspond to the memory 920 of FIG. 9. The local memory 1125 may correspond to any of the above described temporary or local buffers/memories, while the memory 1130 may store a database from which kernel elements and/or image elements may be loaded from and into the local memory 1125. In an example, the local buffers/memories may be memories of the processor 1120 or buffers/memories directly connected to the processor 1120, e.g., configured for rapidly transferring data to/from the processor 1120 and the local memory 1125, noting that alternatives are also available. The local memory 1125 may further be allocated to temporarily store convolutional output results of a particular layer of the CNN, or all layers of the CNN, the ultimate output results of which may be stored in the memory 1130 and/or respectively used for inputs to a next layer. In an example, except for purposes of an input to a next layer, the convolutional results of each layer may discarded and only final layer(s) output results of the CNN stored to the memory 1130 or used for another process, such as in cooperation with an unlocking and corresponding display operation of a mobile phone as the electronic system or device 1100. As also noted, the processor 1120 may represent one or more processors that are configured as any or any combination of the above neural network apparatuses, recognition apparatuses, rejection apparatuses, and/or verification apparatuses, as non-limiting examples.

The sensor 1110 includes, for example, a microphone to sense audio data and/or an image sensor or camera to sense video data, e.g., to recognize, reject, or verify an object, for example. The sensor 1110 senses an image using a well-known scheme, for example, a scheme of converting an optical image to an electronic signal. An output of the sensor 1110 is transferred to the processor 1120 or the memory 1130, and output of the sensor 1110 may also be transferred directly to, or operate as, an input layer of any of the CNNs discussed herein.

The processor 1120 may be configured to perform one or more or all processes described with reference to FIGS. 1 through 10. For example, to perform an object detection, recognition, rejection, and/or verification operations, the processor 1120 may detect, recognize, reject, and/or verify one or more objects in the input data based on the neural network operations described above with respect to FIGS. 1-9, for example. For example, the processor 1120 may determine a result of the convolution operation and a result of the deconvolution operation, or a combination of the same. In such an example, a result of the convolution may be detection of an object, and a result of the deconvolution may be spatial or location indications of the detected object.

Thus, the result of any of the recognition, rejection, or verification operations may be output through the display 1150. In addition, user adjustments or selective operations of the electronic device 1100 be provided by UI 1160, which may include a touch screen or other input device/system. In an example, the processor 1120 may be a graphics processor unit (GPU), a central processing unit (CPU), a reconfigurable processor, an application processor (AP), a neural processing unit (NPU), tensor processing unit (TPU), a HW accelerator, or otherwise an neuromorphic chip, or have any other type of multi- or single-processor configuration. In an example, the processor 1120 is further representative of multiple processors, e.g., with at least one processor being configured as such specialized neural network implementing processors and another processor configured to perform the other operations of the electronic device. Such specialized neural network implementing processors may also be configured in a secure area, with the corresponding processor 1120 and local memory 1125 being securely separated from other operations of other corresponding processors 1120 and the memory 1130, for example.

In addition to operations of one or more of the neural network apparatuses and/or operations described in FIGS. 1-9, as noted above, the memory 1130 may further store instructions which, when executed by processor 1120, cause the processor 1120 to perform additional operations, functions, and controls of the electronic system or device 1100, such as a user interface of the electronic system. The electronic system or device 1100 may be connected to an external device, for example, a personal computer (PC) or a network, via an input/output device of the electronic system, to exchange data with the external device. The electronic system or device 1100 may be various electronic devices, as only non-limiting examples, a mobile device, for example, a mobile telephone, a smartphone, a personal digital assistant (PDA), a tablet computer or a laptop computer, a computing device, for example, a PC, a tablet computer or a netbook computer, an electronic product, for example, a television (TV), a smart TV, or a security device for gate control.

One or more embodiments of the present disclosure may be embodied as a non-transitory recording medium, e.g., a program instruction to be executed in computers, which include computer-readable commands. The non-transitory computer storage medium may include any usable medium that may be accessed by computers, volatile and non-volatile media, and detachable and non-detachable media. Also, the non-transitory computer storage medium may include a computer storage medium and a communication medium. The non-transitory computer storage medium includes all of volatile and non-volatile media, and detachable and non-detachable media which are designed to store information including computer readable commands, data structures, program modules, or other data.

Further, in this specification, the term "unit" denotes a hardware component, such as a processor or a circuit, and/or such hardware components that further execute instructions to implement the herein described operations.

The neural network apparatus 90, the processor 910, the memory 920, electronic system or device 1100, bus 1140, processor 1120, local memory 1125, sensor 1110, memory 1130, display 1150, and user interface 1160 in FIGS. 1-11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network apparatus, the apparatus comprising:
a processor configured to:
obtain an input feature map and a first kernel to be processed in a deconvolution layer of a neural network, the first kernel having a first size;
generate, in a compiling step, a second kernel having the first size by rotating the first kernel by a predetermined degrees in a clockwise direction by performing a transpose operation;
generate, in the compiling step, sub-kernels having a second size by dividing the second kernel based on a stride value by performing a split operation, the second size being smaller than the first size;
perform a convolution operation between the input feature map and the sub-kernels using a convolution operator; and
generate an output feature map, as a deconvolution of the input feature map, by merging results of the convolution operation.

2. The apparatus of claim 1, wherein:
the processor is further configured to divide the second kernel into the sub-kernels, and
the number of the sub-kernels corresponds to a value obtained by squaring the stride value.

3. The apparatus of claim 2, wherein the processor is further configured to:
obtain, from a memory, information of the stride value, and
generate the sub-kernels based on the obtained information of the stride value.

4. The apparatus of claim 1, wherein the processor is configured to perform the convolution operation, using the convolution operator, in a deconvolution layer of a neural network, where the neural network further comprises a convolutional layer that performs a corresponding convolution operation using the convolution operator, and a fully connected layer.

5. The apparatus of claim 1, wherein the processor is further configured to:
process the sub-kernels in parallel, by performing the convolution operation between the sub-kernels and the input feature map by shifting each of the sub-kernels with respect to the input feature map, and
generate the output feature map by merging results of the parallel processing of the sub-kernels.

6. A neural network apparatus, the apparatus comprising:
a memory configured to store sub-kernels; and
a processor configured to:
obtain, from the memory, the sub-kernels,
perform a convolution operation between an input feature map and the sub-kernels using a convolution operator, and
generate an output feature map, as a deconvolution of the input feature map, by merging results of the convolution operation,
wherein the sub-kernels obtained from the memory are generated in a compiling step by adjusting an arrangement of matrix elements comprised in an initial kernel by performing a transpose operation, and dividing the adjusted initial kernel based on a stride value by performing a split operation,
wherein the transpose operation is performed by rotating the initial kernel by a predetermined degrees in a clockwise direction, and wherein each of the initial kernel and the adjusted initial kernel has a first size, and each of the sub-kernels have a second size being smaller than the first size.

7. The apparatus of claim 6, wherein the number of the sub-kernels corresponds to a value obtained by squaring the stride value.

8. The apparatus of claim 6, wherein the processor is configured to perform the convolution operation, using the convolution operator, in a deconvolution layer of a neural network, where the neural network further comprises a convolutional layer that performs a corresponding convolution operation using the convolution operator, and a fully connected layer.

9. The apparatus of claim 6, wherein the processor is further configured to:
process the sub-kernels in parallel, by performing the convolution operation between the sub-kernels and the input feature map by shifting each of the sub-kernels with respect to the input feature map, and
generate the output feature map by merging results of the parallel processing of the sub-kernels.

10. A processor-implemented neural network method, the method comprising:
obtaining, from a memory, a first kernel having a first size,
generating, in a compiling step, a second kernel by adjusting an arrangement of matrix elements comprised in the first kernel by performing a transpose operation;
generating, in the compiling step, sub-kernels having a second size by dividing the second kernel based on a stride value by performing a split operation, the second size being smaller than the first size;
performing a convolution operation between an input feature map and the sub-kernels using a convolution operator; and
generating an output feature map, as a deconvolution of the input feature map, by merging results of the convolution operation,
wherein the adjusting of the arrangement of the matrix elements comprised in the first kernel comprises rotating the first kernel by a predetermined degrees in a clockwise direction.

11. The method of claim 10, further comprising performing the convolution operation, using the convolution operator, in a deconvolution layer of a neural network, where the neural network further comprises a convolutional layer that performs a corresponding convolution operation using the convolution operator, and a fully connected layer.

12. The method of claim 10, wherein the generating of the output feature map comprises:
processing the sub-kernels in parallel, by performing the convolution operation between the sub-kernels and the input feature map by shifting each of the sub-kernels with respect to the input feature map, and
generating the output feature map by merging results of the parallel processing of the sub-kernels.

13. The method of claim 10, wherein matrix elements of the output feature map, corresponding to results from the convolution operation between the input feature map and a sub-kernel of the sub-kernels, are separated by a stride of the convolution operation.

14. The method of claim 13, wherein:
the second kernel is divided into the sub-kernels, and
the number of the sub-kernels corresponds to a value obtained by squaring the stride value.

15. A non-transitory computer-readable storage medium storing instructions that, when executed by a processor, cause the processor to perform the method of claim 10.

* * * * *